United States Patent
Martin (10) Patent No.: US 9,308,909 B2
(45) Date of Patent: Apr. 12, 2016

(54) METHOD AND SYSTEM FOR ENGINE CONTROL

(71) Applicant: Ford Global Technologies, LLC, Dearborn, MI (US)

(72) Inventor: Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 392 days.

(21) Appl. No.: 13/911,880

(22) Filed: Jun. 6, 2013

(65) Prior Publication Data

US 2014/0364273 A1 Dec. 11, 2014

(51) Int. Cl.
*F01N 3/00* (2006.01)
*B60W 10/08* (2006.01)
*B60W 10/06* (2006.01)
*B60W 20/00* (2006.01)

(52) U.S. Cl.
CPC .............. *B60W 10/08* (2013.01); *B60W 10/06* (2013.01); *B60W 20/40* (2013.01); *B60Y 2400/15* (2013.01); *Y10S 903/902* (2013.01); *Y10T 477/23* (2015.01)

(58) Field of Classification Search
CPC ..... B60W 10/06; B60W 10/08; B60W 20/40; B60Y 2400/15; Y10S 903/902; Y10T 477/23
See application file for complete search history.

(56) References Cited

U.S. PATENT DOCUMENTS

| | | | | |
|---|---|---|---|---|
| 4,481,773 A * | 11/1984 | Sugito | ............... | F02B 21/00 60/606 |
| 7,314,043 B1 | 1/2008 | Berger et al. | | |
| 7,762,069 B2 * | 7/2010 | Gerum | ............... | B60T 17/02 123/585 |
| 7,877,996 B2 * | 2/2011 | Berger | ............... | F01L 3/06 60/598 |
| 2007/0283939 A1 * | 12/2007 | Berger | ............... | F01L 3/06 123/585 |
| 2008/0099259 A1 * | 5/2008 | Tomo | ............... | B60K 6/445 180/65.265 |
| 2009/0050119 A1 * | 2/2009 | Inoue | ............... | F02D 41/045 123/564 |
| 2010/0011789 A1 * | 1/2010 | Carlson | ............... | B60H 1/004 62/158 |
| 2010/0218750 A1 * | 9/2010 | Negre | ............... | F01B 17/02 123/540 |
| 2010/0307440 A1 * | 12/2010 | Ma | ............... | F02D 13/04 123/179.3 |
| 2010/0314186 A1 * | 12/2010 | Ma | ............... | B60K 6/12 180/165 |
| 2011/0132335 A1 * | 6/2011 | Pursifull | ............... | F02B 21/00 123/564 |
| 2011/0253098 A1 * | 10/2011 | Pursifull | ............... | B60T 17/06 123/336 |
| 2011/0253111 A1 * | 10/2011 | Pursifull | ............... | F02B 21/02 123/559.1 |
| 2011/0283976 A1 * | 11/2011 | Schaffeld | ............... | F02D 41/0007 123/564 |
| 2012/0088630 A1 * | 4/2012 | Zhang | ............... | B60W 10/30 477/52 |
| 2012/0144826 A1 * | 6/2012 | Rebhan | ............... | F02B 21/00 60/611 |
| 2013/0116898 A1 * | 5/2013 | Lundberg | ............... | B60W 10/06 701/54 |

OTHER PUBLICATIONS

Martin, Douglas Martin et al., "Method and System for Engine Control," U.S. Appl. No. 13/645,286, filed Oct. 4, 2012, 39 pages.
Haladyna, Ted, "Method and System for Oil Dilution Control," U.S. Appl. No. 13/647,990, filed Oct. 9, 2012, 34 pages.

* cited by examiner

*Primary Examiner* — Jesse Bogue
(74) *Attorney, Agent, or Firm* — David Kelley; Alleman Hall McCoy Russell & Tuttle LLP (57) ABSTRACT

Methods and systems are provided for improving engine restarts in a hybrid vehicle. In response to a wide-open pedal tip-in, maximum torque is rapidly provided by cranking an engine while advancing intake cams and while discharging compressed air from an accumulator into the engine intake. Motor torque can be transitioned out faster since maximum engine torque output is enabled earlier.

19 Claims, 5 Drawing Sheets

METHOD AND SYSTEM FOR ENGINE CONTROL

FIELD

The present application relates to improving engine restarts during high torque demand in hybrid vehicles.

BACKGROUND AND SUMMARY

Reduced engine operation times in hybrid vehicles enable fuel economy and fuel emissions benefits. However, having the internal combustion engine off when the vehicle is driven in an electric mode and then performing a smooth engine restart can delay the delivery of torque from the engine. The delay can be exacerbated in engines operating on a Miller cycle where a boosting device (such as a turbocharger or a supercharger) has to spool up before delivering high pressure air to the air intake system.

One example approach for reducing the delay in turbocharger spool-up (also referred to as turbo lag) is shown by Berger et al. in U.S. Pat. No. 7,314,043. Therein, compressed air is delivered from a dedicated source to an engine intake manifold during selected conditions to provide an increase in cylinder charge when a turbocharger has not yet attained sufficient speed to provide the desired boost pressure. In this way, flow amplification is implemented until the turbocharger comes up to speed.

However, the inventors have identified potential issues with such an approach. As an example, hybrid vehicles may typically use under-sized engine systems. Since the turbocharger in such engine systems are spooled up from exhaust pressure, there may be considerable delay in achieving maximum torque. While adding compressed air to the intake, as per the approach of Berger, may reduce the time required for the turbocharger to spool-up, engine restart may still be delayed due to the added delay of starting and cranking the engine after the turbocharger has spooled up. For example, if the compressed air is added too early or too late, it may be wasted. In hybrid vehicles where the engine torque is required to meet an elevated driver demand, the combined delay in engine starting can lead to a substantial delay in maximum torque output and poor vehicle torque response. In addition, since motor torque is used to meet the torque demand before the engine is started, the system battery may discharge faster. Overall, undersized engines using turbo-boosted power may be not able to deliver impressive acceleration for up to several seconds.

In one example, some of the above issues may be addressed by a method for a hybrid vehicle comprising: during vehicle operation using motor torque to drive vehicle wheels, in response to a tip-in to wide-open-pedal, restarting the engine, and during engine cranking of the restarting, discharging compressed air from an accumulator to the engine while operating with advanced intake valve timing. In this way, camshaft timing adjustments and compressed air injection can be coordinated to reduce both the delay in turbocharger spool up and engine restart.

As an example, a hybrid vehicle system may include an engine and a motor. The engine may operate on a Miller engine cycle. During conditions when the operator torque demand is lower, the engine may be switched off and the torque demand may be met by the system motor. A high pressure air accumulator may be coupled to the engine intake manifold via a valve. The high pressure air accumulator may have been filled during previous engine operating conditions by opening the valve slightly so that a portion of the compressed aircharge being delivered to the engine can be stored in the accumulator. Once filled, the valve may be closed. In response to an elevated operator torque demand (such as an operator pedal tip-in to a wide open pedal position where maximum torque is requested), the engine may be restarted to meet the maximum torque demand. Specifically, the accumulator valve may be opened (e.g., fully opened) and compressed air may be discharged from the pressure accumulator into the engine intake manifold while the engine is cranking and while an engine transmission is in gear (e.g., a forward gear). A timing of opening of the valve may be adjusted based on a first engine combustion event from rest such that the compressed air is discharged into the first firing cylinder during the initial fueling of the first firing cylinder (or into a first number of firing cylinders during the initial fueling of the engine). When discharged in coordination with the fueling of the first firing cylinder, the added compressed air enables a higher engine torque output to be achieved while also expediting turbine spool-up. While opening the accumulator valve, an intake camshaft timing may also be advanced (e.g., fully advanced) to a position that allows maximum airflow and thereby maximum power output. By adjusting the intake cam timing, substantially all the injected compressed air can be used for improving engine restart response, and none of the injected air is wasted. As such, during other operator pedal tip-ins, where the pedal is not displaced to the wide-open position, the accumulator valve may be maintained closed and the intake camshaft timing may follow a nominal schedule. For example, while the engine is cranked, the intake camshaft may be retarded to provide a smooth engine restart.

In this way, by advancing an intake camshaft timing during engine cranking while delivering compressed air from a pressure accumulator to an engine intake, a delay in the onset of maximal engine torque output can be reduced (e.g., by several seconds, such as ~3 seconds). The timed addition of compressed air reduces the combined delay from turbine spool-up as well as engine cranking, thereby enabling a smooth and expedited engine restart to be provided in a hybrid vehicle. By expediting the delivery of maximal engine torque, the interim dependence on motor torque can be reduced, improving battery life. In addition, NVH issues and issues related to the loss of refinement in the vehicle wheel can also be reduced. Overall, hybrid vehicle performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
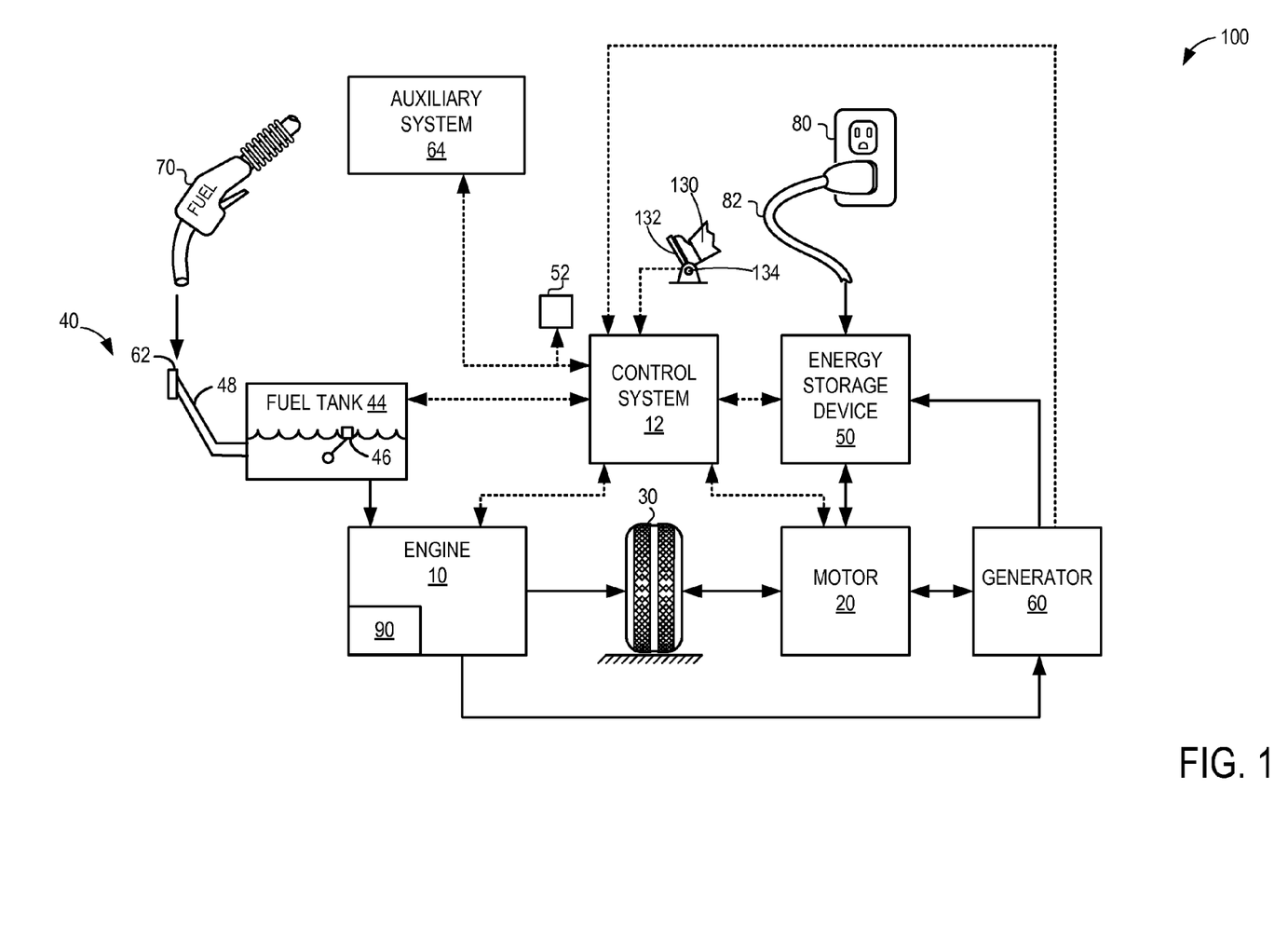
FIG. 1 illustrates an example hybrid vehicle system.

The following description relates to systems and methods for operating a hybrid electric vehicle, such as the plug-in hybrid electric vehicle of FIG. 1. During selected conditions, such as a pedal tip-in to wide-open pedal, vehicle wheels may be transitioned from being propelled using motor torque to being propelled using engine torque, such as from the engine of FIG. 2. A controller may be configured to perform a control routine, such as the routine of FIG. 4, to restart the engine by cranking while operating the engine with intake valve timing advanced. The controller may also discharge compressed air from a high pressure air accumulator, such as the accumulator of FIG. 3, to the engine intake manifold while advancing intake valve timing to expedite turbine spool-up and maximum engine torque output. A timing of opening an accumulator valve to discharge the compressed air may be coordinated with the fueling of a first firing cylinder during the engine restart. An example engine restart is shown with reference to FIG. 5. In this way, a smooth engine restart is provided in a hybrid vehicle system.

FIG. 1 illustrates an example vehicle propulsion system 100. Vehicle propulsion system 100 includes a fuel burning engine 10 and a motor 20. As a non-limiting example, engine 10 comprises an internal combustion engine and motor 20 comprises an electric motor. Motor 20 may be configured to utilize or consume a different energy source than engine 10. For example, engine 10 may consume a liquid fuel (e.g. gasoline) to produce an engine output while motor 20 may consume electrical energy to produce a motor output. As such, a vehicle with propulsion system 100 may be referred to as a hybrid electric vehicle (HEV). Specifically, propulsion system 100 is depicted herein as a plug-in hybrid electric vehicle (PHEV).

Vehicle propulsion system 100 may be operated in a variety of different modes depending on vehicle operating conditions. Some of these modes may enable engine 10 to be maintained in an off state (or deactivated state) where combustion of fuel at the engine is discontinued. For example, under select operating conditions, motor 20 may propel the vehicle via drive wheel 30 while engine 10 is deactivated. Therein, the vehicle wheels are driven with motor torque.

During other operating conditions, engine 10 may be deactivated while motor 20 is operated to charge energy storage device 50 via regenerative braking. Therein, motor 20 may receive wheel torque from drive wheel 30 and convert the kinetic energy of the vehicle to electrical energy for storage at energy storage device 50. Thus, motor 20 can provide a generator function in some embodiments. However, in other embodiments, a dedicated energy conversion device, herein generator 60 may instead receive wheel torque from drive wheel 30 and convert the kinetic energy of the vehicle to electrical energy for storage at energy storage device 50.

During still other operating conditions, engine 10 may be operated by combusting fuel received from fuel system 40. For example, engine 10 may be operated to propel the vehicle via drive wheel 30 while motor 20 is deactivated. During other operating conditions, both engine 10 and motor 20 may each be operated to propel the vehicle via drive wheel 30. A configuration where both the engine and the motor may selectively propel the vehicle may be referred to as a parallel type vehicle propulsion system. Note that in some embodiments, motor 20 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 20, which may in turn propel the vehicle via drive wheel 30. For example, during select operating conditions, engine 10 may drive generator 60, which may in turn supply electrical energy to one or more of motor 20 or energy storage device 50. As another example, engine 10 may be operated to drive motor 20 which may in turn provide a generator function to convert the engine output to electrical energy, where the electrical energy may be stored at energy storage device 50 for later use by the motor. The vehicle propulsion system may be configured to transition between two or more of the operating modes described above depending on operating conditions.

A high pressure air accumulator 90 may be coupled to engine 10. Specifically, the accumulator may be coupled to an intake manifold of engine 10 via an accumulator valve. As elaborated with reference to FIG. 3, the valve may be selectively and slightly opened during engine operating conditions to charge the pressure accumulator with compressed air from the intake manifold, the compressed air delivered to the intake manifold from a turbocharger compressor coupled to the engine. Once charged, the valve may be closed to hold the pressure in the accumulator. As elaborated at FIG. 4, during selected engine restart conditions, such as when restarting an engine of the hybrid vehicle to transition from motor torque to engine torque in response to an operator tip-in to wide-open pedal position, the accumulator valve may be opened (e.g., fully opened) to discharge compressed air to the intake manifold to provide flow amplification and smoother engine restart. At the same time, the engine may be operated with intake valve timing advanced so that maximum airflow to the cylinders is enabled. By adjusting a timing of opening the valve and discharging of the compressed air based on initial fueling of engine cylinder(s) during the engine restart, the added compressed air expedites turbine spool-up and delivery of maximum engine power output. As such, this not only provides a smoother engine restart but also allows for an earlier transition from motor torque to engine torque.

Returning to FIG. 1, fuel system 40 may include one or more fuel storage tanks 44 for storing fuel on-board the vehicle and for providing fuel to engine 10. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g. E10, E85, etc.) or a blend of gasoline and methanol (e.g. M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 50 via motor 20 or generator 60.

Fuel tank 44 may include a fuel level sensor 46 for sending a signal regarding a fuel level in the tank to control system (or controller) 12. Fuel level sensor 46 may comprise a float connected to a variable resistor, as shown. Alternatively, other types of fuel level sensors may be used. The level of fuel stored at fuel tank 44 (e.g. as identified by the fuel level sensor) may be communicated to the vehicle operator, for example, via a fuel gauge or indication lamp indicated at 52. Fuel system 40 may periodically receive fuel from an external fuel source. For example, in response to a fuel level in the fuel tank falling below a threshold, a fuel tank refill request may be made and the vehicle operator may stop the vehicle for refilling. Fuel may be pumped into the fuel tank from fuel dispensing device 70 via a refueling line 48 that forms a passageway from a refueling door 62 located on an outer body of the vehicle.

Control system 12 may communicate with one or more of engine 10, motor 20, fuel system 40, energy storage device 50, and generator 60. Specifically, control system 12 may receive feedback from one or more of engine 10, motor 20, fuel system 40, energy storage device 50, and generator 60 and send control signals to one or more of them in response. Control system 12 may also receive an indication of an operator requested output of the vehicle propulsion system from a vehicle operator 130. For example, control system 12 may receive feedback from pedal position sensor 134 which communicates with pedal 132. Pedal 132 may refer schematically to an accelerator pedal (as shown) or a brake pedal.

Energy storage device 50 may include one or more batteries and/or capacitors. Energy storage device 50 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 50 may periodically receive electrical energy from an external power source 80 not residing in the vehicle. As a non-limiting example, vehicle propulsion system 100 may be configured as a plug-in hybrid electric vehicle (HEV), whereby electrical energy may be supplied to energy storage device 50 from power source 80 via an electrical energy transmission cable 82. During a recharging operation of energy storage device 50 from power source 80, electrical transmission cable 82 may electrically couple energy storage device 50 and power source 80. While the vehicle propulsion system is operated to propel the vehicle, electrical transmission cable 82 may be disconnected between power source 80 and energy storage device 50. Control system 12 may estimate and/or control the amount of electrical energy stored at the energy storage device, referred to herein as the state of charge (SOC).

In other embodiments, electrical transmission cable 82 may be omitted, where electrical energy may be received wirelessly at energy storage device 50 from power source 80. For example, energy storage device 50 may receive electrical energy from power source 80 via one or more of electromagnetic induction, radio waves, and electromagnetic resonance. As such, it should be appreciated that any suitable approach may be used for recharging energy storage device 50 from the external power source 80. In this way, motor 20 may propel the vehicle by utilizing an energy source other than the fuel utilized by engine 10.

Figure 2:
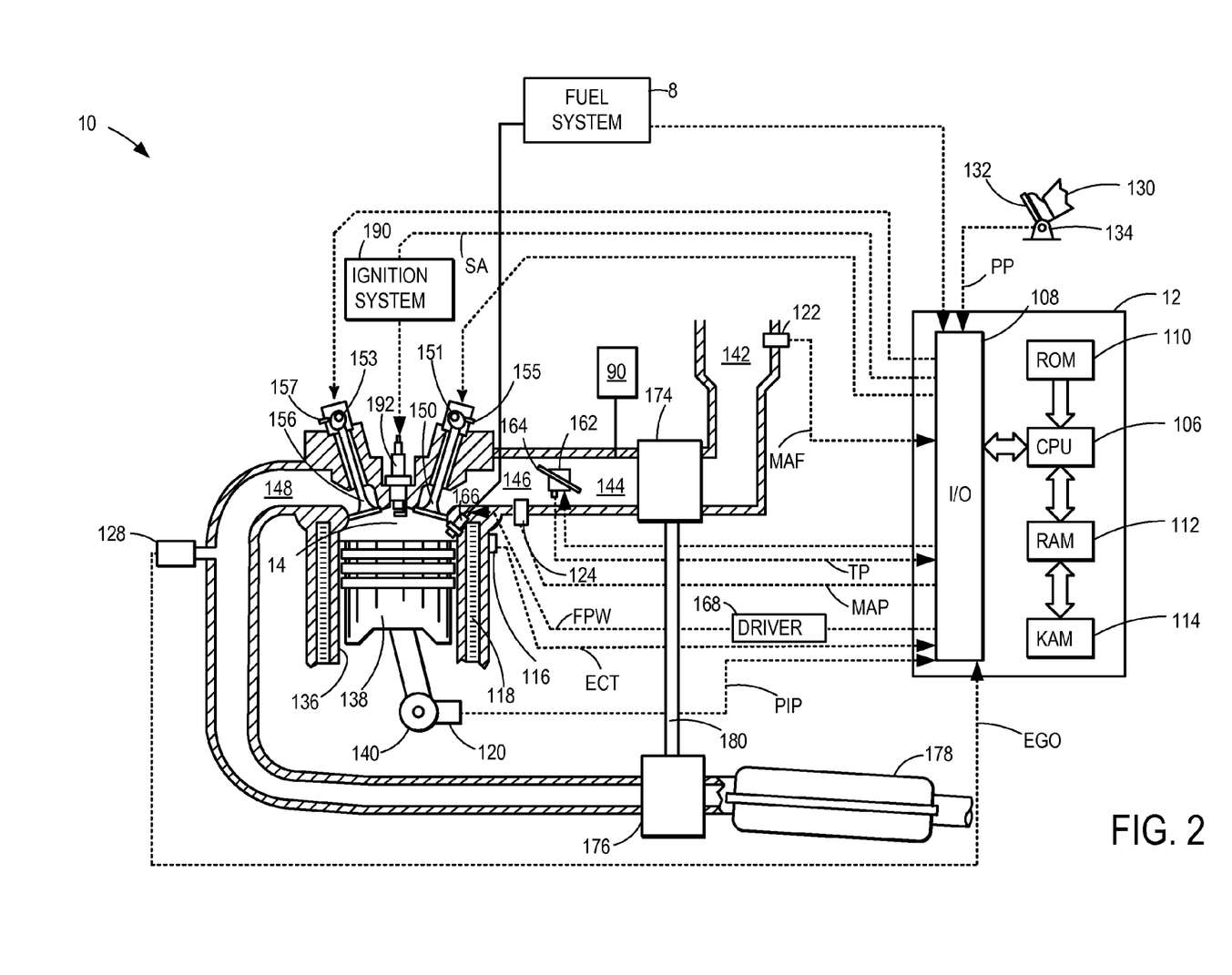
FIG. 2 illustrates an example internal combustion engine coupled in the hybrid vehicle system of FIG. 1.

As elaborated in FIG. 2, controller 12 may receive input data from various sensors, process the input data, and trigger various actuators in response to the processed input data based on instruction or code programmed therein corresponding to one or more routines. An example control routine is described herein with regard to FIG. 6.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Figure 3:
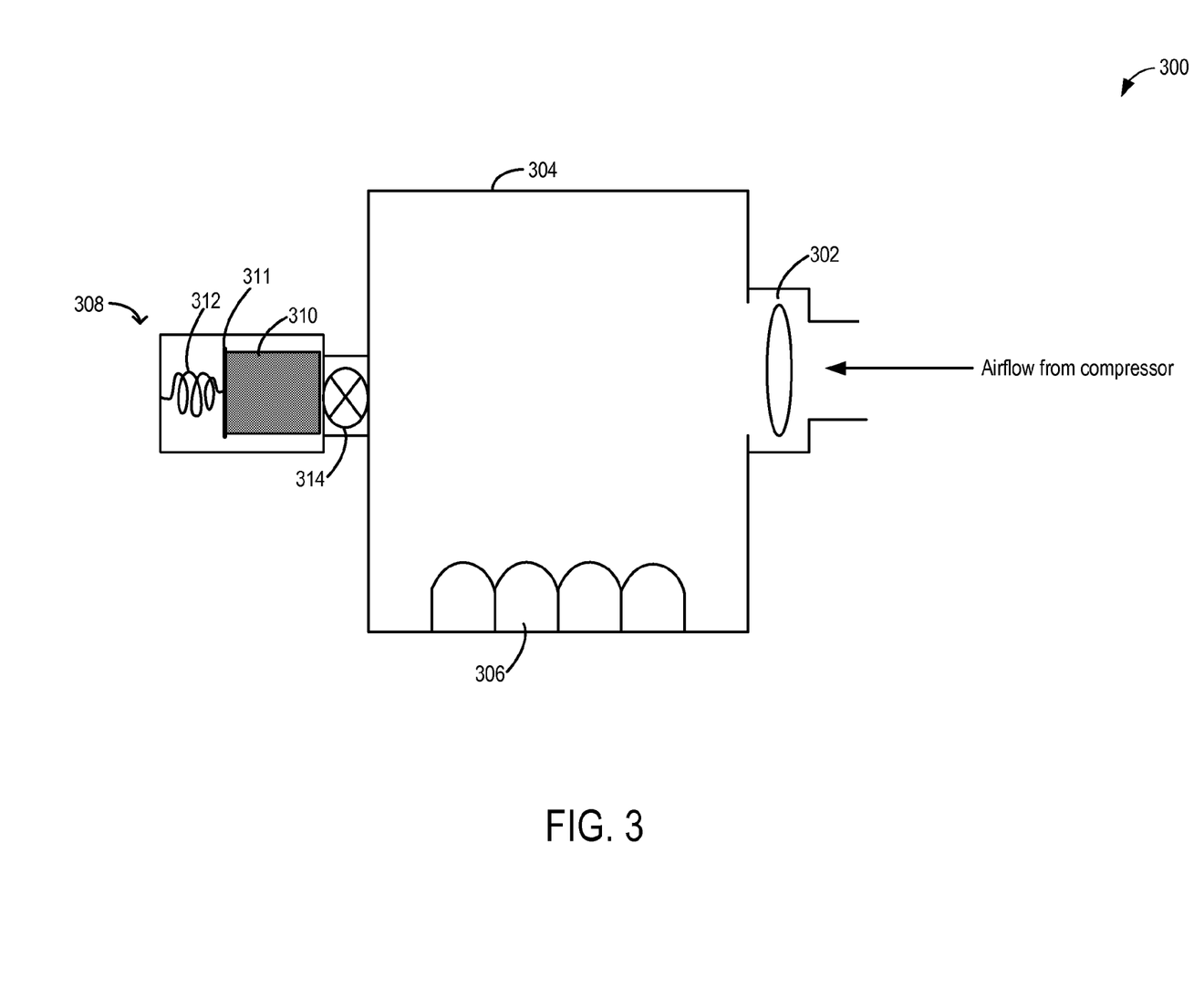
FIG. 3 shows an example embodiment of a pressure accumulator coupled to the engine of FIGS. 1-2.

Pressure accumulator 90, as elaborated at FIG. 3, may be coupled to the intake passage 146, downstream of compressor 174 via a valve (not shown). During discharging conditions, the accumulator valve may be opened to release high pressure compressed air from the accumulator to the intake manifold for improving engine restart response times. During charging conditions, the accumulator valve may be opened to charge the accumulator with compressed air from the intake manifold.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, different fuel volatilities, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 106 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 166, throttle 162, spark plug 192, intake/exhaust valves and cams, etc. The controller may receive input data from the various sensors, process the input data, and trigger the actuators in response to the processed input data based on instruction or code programmed therein corresponding to one or more routines. An example control routine is described herein with regard to FIG. 4.

As such, the engine of FIGS. 1-2 may be operated on a Miller engine cycle. While the traditional Otto cycle engine uses four strokes (intake, compression, power and exhaust strokes), the Miller engine cycle includes a fifth stroke. As such, of the four strokes of the Otto cycle, two can be considered high power: the compression stroke (high power consumption) and power stroke (high power production). However, much of the internal power loss of an engine is due to the energy needed to compress the charge during the compression stroke, so systems that reduce this power consumption can lead to greater efficiency. In the Miller cycle, the intake valve is left open longer than it would be in an Otto cycle engine. In effect, the compression stroke is two discrete cycles: the initial portion when the intake valve is open and final portion when the intake valve is closed. This two-stage intake stroke creates the so called "fifth" stroke that the Miller cycle introduces. As the piston initially moves upwards in the compression stroke, the charge is partially expelled back out the still-open intake valve. Typically this loss of charge air would result in a loss of power. However, in the Miller cycle, this is compensated for by the use of a boosting device, such as a supercharger or a turbocharger. The boosting device may be a positive displacement type due to its ability to produce boost at relatively low engine speeds. As such, in the Miller cycle, the compression stroke actually starts only after the piston has pushed out the extra charge and the intake valve closes. This happens at around 20% to 30% into the compression stroke. In other words, the actual compression occurs in the latter 70% to 80% of the compression stroke.

Now turning to FIG. 3, an example embodiment 300 of the pressure accumulator of FIG. 1 is shown. The pressure accumulator may be filled or charged with compressed air during engine operation. The compressed air may then be discharged from the accumulator during a transition from electric mode to engine mode of hybrid vehicle operation to improve the quality of an engine restart.

Compressed airflow from an intake boosting device, such as a turbocharger compressor, is received in engine intake manifold 304 along an intake passage, via air intake throttle 302. From there the high pressure air may be received in engine cylinder 306.

As such, the intake manifold air pressure is high when the compressor is operating, but the high pressure is slow to build from an engine stop. Thus, during an engine restart, to expedite turbine spool-up and enable maximum engine torque output, high pressure air may be received in the intake manifold from high pressure air accumulator 308. The accumulator may be coupled to intake manifold 304 via accumulator valve 314. During engine operating conditions, such as when the engine is operating boosted at or above an idle engine speed, the accumulator valve 314 may be opened (e.g., slightly opened) to store compressed air in the accumulator. In particular, high pressure air may be stored in a bladder 310 of accumulator 308. A spring 312 and plate 313 arrangement between the compressed air bladder 310 and the wall of accumulator 308 allows the entire volume of the bladder to be pushed out and filled with compressed air from the intake manifold.

During an engine restart, accumulator valve 314 may be opened (e.g., fully opened) to release compressed air from the accumulator into the intake manifold. This may be performed during engine cranking, in coordination with cylinder fueling, so that the discharged air is combusted in the firing cylinder. The discharging may be performed while an engine transmission is in gear (e.g., while the transmission is in forward gear) and while an intake valve timing is advanced. As such, if the discharging is performed while the engine is in a park gear, the air compressed in the engine spin-up may deliver a large torque without having a place to send it, producing an undesirable vehicle reaction while in Park. By discharging the high pressure air from the accumulator into the intake manifold during an engine restart with the intake valves advanced to a maximum flow position, before high pressure has been built up in the intake manifold by the turbocharger, engine torque output can be improved. Specifically, maximum torque output can be provided during an engine restart responsive to an operator tip-in to wide open pedal positions.

It will be appreciated that while the embodiment of FIG. 3 uses the same accumulator valve for both charging and discharging the accumulator, in alternate embodiments, the accumulator may include a small check valve positioned in parallel to accumulator valve 314 for charging. Therein, the smaller check valve may be opened to charge the pressure accumulator while accumulator valve 314 may only be opened during wide-open pedal engine restarts.

In this way, the components of FIGS. 1-3 enables a method for a hybrid vehicle, comprising: driving vehicle wheels using motor torque. Then, in response to operator torque demand being higher than a threshold, the method includes cranking an engine while advancing intake valve timing, discharging compressed air from an accumulator to the engine during fueling of a first firing cylinder of an engine restart following the cranking, and transitioning to driving vehicle wheels using engine torque after a threshold engine speed is reached. The accumulator is coupled to an intake manifold of the engine, downstream of a turbocharger compressor, via an accumulator valve such that the discharging includes partially opening the accumulator valve. After the threshold engine speed is reached, the method includes slightly opening the accumulator valve to fill the accumulator with compressed air from the engine manifold.

Figure 4:
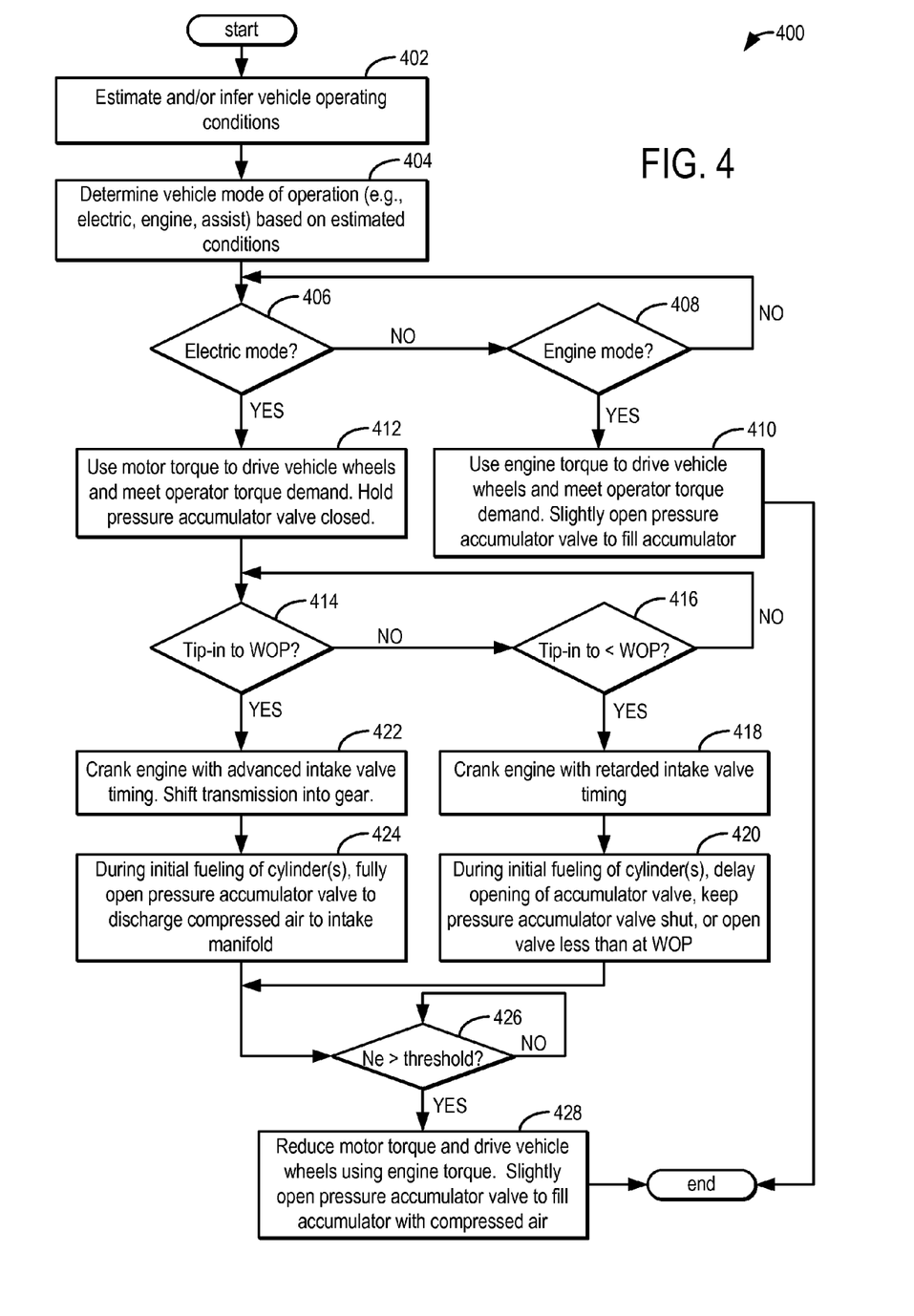
FIG. 4 illustrates a high level flow chart illustrating a routine for performing an engine restart using pressure from a pressure accumulator.

Now turning to FIG. 4, an example method 400 is shown for improving an engine restart in a hybrid vehicle using compressed air discharged from a pressure accumulator to an intake manifold. The method enables an earlier and smoother transition in vehicle operation with motor torque to vehicle operation with engine torque.

At 402, vehicle operating conditions may be estimated and/or inferred. For example, the control system may receive sensor feedback from one or more sensors associated with the vehicle propulsion system components, as described above. Operating conditions estimated may include, for example, an indication of vehicle operator requested output or torque (e.g., based on a pedal position), a fuel level at the fuel tank, engine fuel usage rate, engine temperature, state of charge (SOC) of the on-board energy storage device, ambient conditions including humidity and temperature, engine coolant temperature, climate control request (e.g., air-conditioning or heating requests), etc.

At 404, based on the estimated vehicle operating conditions, a mode of vehicle operation may be selected. For example, it may be determined whether to operate the vehicle in an electric mode (with the vehicle being propelled using energy from an on-board system energy storage device, such as a battery or electric motor), or an engine mode (with the vehicle being propelled using energy from the engine). Further still, it may be determined whether to operate the vehicle in an assist mode (with the vehicle being propelled using at least some energy from the battery and at least some energy from the engine).

At 406, it may be determined if the electric mode was selected. If not, then at 408, it may be determined if the engine mode was selected. If the engine mode was selected, then at 410, the engine may be operated based on the estimated vehicle operating conditions and engine torque may be used to drive the vehicle wheels. Herein, the engine may be operated on the Miller cycle, as discussed earlier. Also, the engine may be operated with nominal intake valve timing. For example, the intake camshaft may be adjusted to a nominal timing based on operating conditions. This may include, for example, cranking the engine with intake valve timing retarded. Additionally, during the engine operation, an accumulator valve coupling a high pressure air accumulator to the engine intake manifold may be opened (e.g., slightly opened) to charge the accumulator with compressed air received in the intake manifold from an upstream turbocharger compressor. A degree of opening of the accumulator valve may be based on the ability of the intake air charging system to fully supply the pressure required by the engine without disturbance. In this way, the accumulator may be kept pre-charged and the compressed air may be discharged during selected engine restart conditions to provide a smooth restart. As such, during the charging of the accumulator, the intake valve timing may be scheduled normally. For example, the intake cam timing may be held at a base position.

Returning to 406, if the electric mode of vehicle operation is selected, then at 412, the vehicle is operated using motor torque to drive vehicle wheels. Additionally, the engine may be maintained shutdown and the accumulator valve may be held closed. As such, during conditions of lower operator torque demand, the vehicle may be driven using torque from the vehicle system motor or battery only.

As such, vehicle operation using motor torque may be continued until there is a transient increase in torque demand, such as due to an operator pedal tip-in, where motor torque may not be sufficient to meet the torque demand. Thus, at 414, it may be determined if there is an operator pedal tip-in and further if the tip-in is to a wide-open pedal (WOP) position. As such, the tip-in to a wide open pedal position indicates an operator sudden request for maximum vehicle torque. As such, the maximum vehicle torque demand may not be met by only the motor torque and thus an engine restart is required to provide maximum engine torque to meet the transient increase in torque demand.

Accordingly, in response to the tip-in to wide-open-pedal request received during vehicle operation using motor torque, at 422, the routine includes restarting the engine. Specifically, the engine may be cranked using energy from a starter motor. The engine may be cranked with intake valve timing advanced. Operating with advanced intake valve timing includes fully advancing an intake camshaft timing, the intake camshaft advanced via electric actuation or cam torque actuation. The fully advanced intake timing allows for maximum airflow to the engine cylinders, and thereby maximum power output from the cylinders during the subsequent engine restart. In addition, an engine transmission may be engaged. For example, the transmission may be shifted to a forward gear (by engaging a forward clutch).

At 424, during engine cranking of the restarting, the routine includes discharging compressed air from the high pressure air accumulator to the engine intake manifold while operating with the advanced intake valve timing. As discussed at FIG. 3, the accumulator may be coupled to the engine intake manifold via an accumulator valve, and discharging compressed air from the accumulator includes opening the accumulator valve. Specifically, the accumulator valve may be fully opened. This allows all the compressed air to be discharged providing maximum airflow to the cylinders.

In alternate examples, the accumulator valve may be partially opened with a degree of opening of the accumulator valve based on the ability of the intake air charging system to fully supply the pressure required by the engine to meet the torque demand without using the entire boost available from the accumulator. For example, as driver demand increases or battery power available decreases, the opening of the accumulator valve may be increased.

As such, the discharging may be performed while the engine transmission is in gear (e.g., while the transmission is in forward gear). This is because if discharging is performed while the engine is in a park gear, the air compressed in the engine spin-up may deliver a large torque without having a place to send it, producing an undesirable vehicle reaction while in Park.

A timing of the discharging may be adjusted based on initial fueling of the engine restarting. For example, a timing of opening of the accumulator valve may be adjusted based on fueling of a first cylinder during a first combustion event from rest of the engine restart. By coordinating the opening of the accumulator valve with fuel injection in the first firing cylinder, the discharged air can be combusted in the first firing cylinder during the first combustion event from start, increasing engine torque output during the engine restart. In addition to enabling maximum engine torque output, the combustion of the discharged air also increases exhaust pressure and temperature, expediting spool-up of the exhaust turbine.

In an alternate example, the timing of the discharging may be adjusted to overlap with the fueling of a first number of cylinders during the first number of combustion events from rest of the engine restart. Herein, the timing of the discharging of the compressed air may be coordinated with the firing order of the cylinders such that the discharged air is combusted in the cylinder in the corresponding combustion event.

The timing of opening of the accumulator may be further adjusted based on an engine operating parameter such as engine coolant temperature (which is used an in indication of an engine cold start). In an alternate example, the timing may be based on an in-cylinder temperature (e.g., an in-cylinder temperature modeled based on a number of combustion events that have occurred within the recent past and further based on engine load. Herein, the in-cylinder temperature may be used as an alternate indication of an engine cold start. For example, the timing may be retarded as the engine coolant temperature decreases to provide for better vaporization of fuel during cold starts.

As discussed below, after engine starting (such as after a tip-out following the tip-in and after engine cranking), the engine may be transitioned to operating with retarded intake valve timing. Specifically, the camshaft timing may be retarded to a nominal timing based on engine operating conditions.

If the operator pedal tip-in is not to a wide-open pedal position at 414, than at 416, it may be determined if the tip-in is to a less than wide-open pedal position. As such, the tip-in to a less than wide-open pedal position indicates an operator sudden request for less than maximum vehicle torque. Accordingly, at 418, in response to the tip-in to less than wide-open-pedal request received during vehicle operation using motor torque, at 420, the routine includes restarting the engine. Specifically, the engine may be cranked using energy from a starter motor. The engine may be cranked with intake valve timing retarded to a nominal position. Operating with retarded intake valve timing includes retarding intake camshaft timing, the intake camshaft retarded via electric actuation or cam torque actuation. An amount of intake retard applied may be based on operating conditions, such as vehicle speed and amount of driver demand torque. As such, the lower the vehicle speed, the greater the driver sensitivity to engine compression vibration during spin-up. Therefore the boost would likely be held shut if the demand on the engine did not require more torque than could be supplied without the accumulator. Alternatively, at 420, the accumulator valve may be opened less than a valve opening using during a tip-in to wide-open pedal (WOP). In still a further example, the opening of the accumulator valve may be delayed and/or phased (relative to the opening of the accumulator valve during a tip-in to WOP). As such, since maximum power output is not required, intake timing is not required to be fully advanced.

At 424, during engine cranking of the restarting, the routine includes holding the pressure air accumulator valve closed and not discharging compressed air from the accumulator to the intake manifold. In this way, the compressed air is discharged and used advantageously only during conditions when maximum engine torque output is required. Thus, at a tip-in to less than wide-open pedal, the controller may restart the engine without discharging compressed air from the accumulator and while operating with retarded intake valve timing.

From 420 and 424, the routine proceeds to 426 where it may be determined whether the engine speed is higher than a threshold speed. For example, it may be determined if engine cranking is completed and engine idle speeds have been reached. At 428, the routine includes reducing motor torque in response to engine speed being higher than a threshold speed (or a "measured" engine torque being greater than a threshold torque). Vehicle operation may then be transitioned out of motor operation to engine operation only. This may include operating with retarded intake valve timing. Specifically, the intake camshaft timing may be retarded to a nominal timing based on the current engine operating conditions.

Also at 428, during engine operation after the engine starting, the routine includes slightly opening the accumulator valve to charge the accumulator with compressed air received in the intake manifold from the turbocharger compressor. A degree of opening of the accumulator valve may be based on the ability of the intake air charging system to fully supply the pressure required by the engine to meet the torque demand without disturbance. For example, as manifold pressure increases, the opening of the accumulator valve may be gradually increased to recharge the accumulator.

It will also be appreciated that after engine starting, the engine may be operated with retarded intake valve timing. For example, after the cranking, and after a tip-out following the tip-in, such as after the engine speed is at or above the idle speed, the intake camshaft may be transitioned to a retarded intake timing, with the amount of retard based on engine operating conditions, to improve engine restart and shutdown smoothness.

In this way, high pressure air may be delivered from an accumulator to the engine intake manifold during an engine restart before high pressure can be provided by a turbocharger. This allows maximum engine torque output to be provided responsive to high torque demand before the turbocharger has spooled up.

In one example, a method for a hybrid vehicle comprises, driving vehicle wheels using motor torque. In response to operator torque demand being higher than a threshold, cranking an engine while advancing intake valve timing, discharging compressed air from an accumulator to the engine during fueling of a first firing cylinder of an engine restart following the cranking, and transitioning to driving vehicle wheels using engine torque after a threshold engine speed (or engine torque) is reached. Herein, the accumulator may be coupled to an intake manifold of the engine, downstream of a turbocharger compressor, via an accumulator valve. Discharging the accumulator may include fully opening the accumulator valve. Further, after the threshold engine speed is reached, the method may include partially opening the accumulator valve to fill the accumulator with compressed air from the engine manifold.

Figure 5:
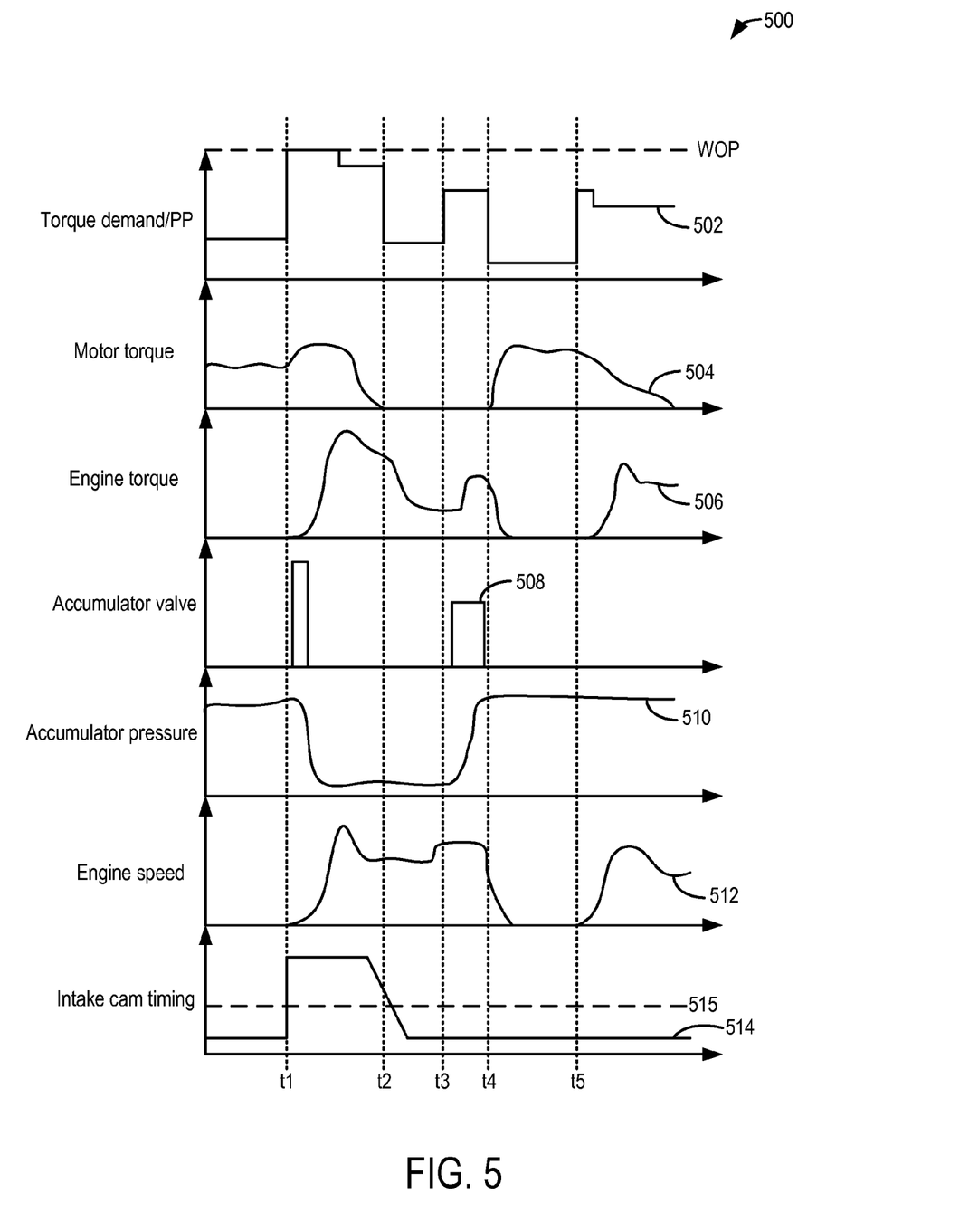
FIG. 5 illustrates example engine restarts according to the present disclosure.

Now turning to FIG. 5, an example engine restart and transition from operating a hybrid vehicle with motor torque to operating the vehicle with engine torque is shown. Specifically, map 500 depicts a pedal position (representative of a torque demand) at plot 502, motor torque at plot 504, engine torque at plot 506, accumulator valve position at plot 508, accumulator pressure at plot 510, engine speed at plot 512, and intake cam timing at plot 514.

Prior to t1, operator torque demand (plot 502) may be lower and the hybrid vehicle may be propelled with motor torque (plot 504) from a system motor and/or battery. That is, the engine may be shutdown. At t1, an operator pedal tip-in to a wide-open pedal position (WOP) may occur, indicating a maximum power output demand. In response to the elevated torque demand, the engine may be restarted. Specifically, the engine may be cranked with a starter motor with a corresponding increase in engine speed (plot 512). During the cranking, to improve the engine restart response time while the turbocharger spools up, an accumulator valve coupling a high pressure air accumulator to the engine intake manifold may be fully opened (plot 508) for a duration to discharge compressed air into the intake. As the accumulator valve opens to release the compressed air, the accumulator pressure may drop (plot 510). The opening of the valve is coordinated with initial fueling of the first firing cylinder so that the released air is combusted in the engine cylinder. This allows a large engine torque output (plot 506) to be delivered to meet the elevated torque demand. As the engine torque output increases, the motor torque may be reduced, allowing for a faster and smoother transition from vehicle operation with motor torque to vehicle operation with engine torque.

As such, prior to t1, the engine may be shutdown with the intake cam timing (plot 514) retarded from a base position 515. This is because of use of retarded valve timing during prior engine operation. At t1, when the engine is restarted in response to the wide-open pedal tip-in, and during the discharging of compressed air to the engine intake, the engine may be operated on a Miller cycle with the intake cam timing (and therefore intake valve timing) advanced from the base position. By advancing the intake valve timing, maximum airflow to the engine cylinders is enabled, which allows all or a large portion of the compressed air received from the accumulator to be received in the engine cylinder(s). Just before t2, following the cranking of the engine and following a subsequent pedal tip-out, the engine speed may reach an idle speed and the intake cam timing may be transitioned to the retarded timing for improved engine responsiveness.

At t2, in response to a drop in torque demand, the engine torque provided may reduce. Between t3 and t4, the turbine may have spooled up and the engine may be operating boosted. During the boosted engine operation, the accumulator valve may be slightly opened for a duration (plot 508) to charge the accumulator with compressed air from the turbocharger with a corresponding increase in accumulator pressure. The valve may be held slightly open until the accumulator is charged and a threshold pressure is reached.

At t4, in response to a larger drop in torque demand, the engine may be shutdown with a gradual decrease in engine speed and torque and the vehicle may be propelled with motor torque only to provide fuel economy benefits. As such, the engine may be shutdown with the intake cam retarded. Vehicle operation with motor torque may continue until t5 when another operator pedal tip-in in received. However, the tip-in at t5 is to less than wide-open pedal (WOP). In response to the tip-in request, the engine may be restarted. However, due to the tip-in being to less than the WOP position, the engine may be restarted without delivering compressed air from the accumulator. That is, the accumulator is held closed. In addition, the engine may be operated with intake cam and valve timing retarded to provide for a smooth engine restart.

Thus, during a first engine hot start (as described at t1), a controller may crank the engine with advanced intake valve timing while discharging compressed air from an accumulator into an intake manifold while during a second engine hot start (as described at t5), the controller may crank the engine with retarded intake valve timing without discharging compressed air from the accumulator into the intake manifold. The controller may be able to transition from driving vehicle wheels with motor torque to driving vehicle wheels with engine torque after a shorter duration since the first engine hot start while transitioning from driving vehicle wheels with motor torque to driving vehicle wheels with engine torque after a longer duration since the second engine hot start. Herein, the first engine hot start is responsive to an operator pedal tip-in to wide-open pedal, while the second engine hot start is responsive to an operator pedal tip-in to less than wide-open pedal. During the first engine hot start, a valve coupling the pressure accumulator to the intake manifold is held partially open, and an air intake throttle is throttled less, while during the second hot start, the valve coupling the pressure accumulator to the intake manifold is held closed, and the air intake throttle is throttled more. Further, during the first engine hot start, cranking the engine with advanced intake valve timing includes cranking the engine with an intake camshaft timing fully advanced, while during the second engine hot start, cranking the engine with retarded intake valve timing includes cranking the engine with the intake camshaft timing retarded by an amount based on vehicle speed and amount of driver demand torque. The lower the vehicle speed the greater the driver sensitively to engine compression vibration during spin-up. Therefore, the boost would likely be held shut if the demand of the engine did not require more torque than could be supplied without the accumulator. In addition, after each of the first and second hot starts, the engine is operated on a miller cycle, and while operating the engine in the miller cycle, the controller may fully or partially open the valve coupled to the accumulator to charge the accumulator with intake manifold compressed air received from a turbocharger compressor until a threshold accumulator pressure is reached, and then close the valve.

In this way, an engine may be restarted with intake valve timing advanced for maximum flow capabilities while flowing additional compressed air from a pressure accumulator to the engine intake manifold. This combined approach allows relatively high (e.g., maximum) torque outputs to be delivered in response to operator torque demand during conditions when the turbine has not yet spooled up. In doing so, delays in the onset of maximal engine torque output can be reduced by several seconds, improving vehicle responsiveness. By timing the addition of compressed air with initial fueling of the engine during the restart, a smooth and expedited engine restart is enabled in a hybrid vehicle and motor torque can be transitioned out earlier. The smoothness of the restart also reduces NVH issues.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled to a hybrid vehicle, comprising:
   during vehicle operation using motor torque to drive vehicle wheels,
      in response to a wide-open-pedal tip-in, restarting the engine; and
      during engine cranking of the restarting, discharging compressed air from an accumulator to the engine while operating with advanced intake valve timing relative to a base timing, wherein the accumulator is coupled to an intake manifold of the engine via an accumulator valve, and wherein the discharging includes fully opening the accumulator valve while an engine transmission is in gear;
   adjusting a timing of the discharging based on initial fueling of the engine restarting, wherein the adjusting includes adjusting a timing of opening the accumulator valve based on fueling of a first cylinder during a first combustion event from rest of the engine restart; and
   wherein the timing of opening is further adjusted based on one or more of engine coolant temperature and in-cylinder temperature, the timing retarded as the engine coolant temperature decreases.

2. The method of claim 1, wherein operating with advanced intake valve timing includes fully advancing an intake camshaft timing, the intake camshaft advanced via electric actuation or cam torque actuation.

3. The method of claim 2, further comprising after engine starting, operating with retarded intake valve timing relative to the base timing.

4. The method of claim 3, further comprising, during engine operation after the engine starting, opening the accumulator valve to charge the accumulator with compressed air received in an engine intake manifold from a turbocharger compressor.

5. The method of claim 4, wherein opening the accumulator valve includes partially opening the accumulator valve, a degree of opening the valve to charge the accumulator based on the ability of an intake air charging system to fully supply a pressure required by the engine to meet a torque demand without disturbance.

6. The method of claim 1, further comprising reducing motor torque in response to engine speed being higher than a threshold speed or engine torque being higher than a threshold torque.

7. The method of claim 1, wherein the engine is operated on a Miller cycle.

8. The method of claim 1, further comprising, in response to a tip-in less than wide-open pedal, restarting the engine without discharging compressed air from the accumulator and while operating with retarded intake valve timing relative to the base timing.

9. A method for a hybrid vehicle, comprising:
   responsive to a hot engine start with engine temperature above a threshold:
      during a first condition, cranking the engine with advanced intake valve timing relative to a base timing while discharging compressed air from an accumulator into an intake manifold; and
      during a second condition, cranking the engine with retarded intake valve timing relative to the base timing without discharging compressed air from the accumulator into the intake manifold.

10. The method of claim 9, further comprising transitioning from driving vehicle wheels with motor torque to driving vehicle wheels with engine torque after a shorter duration since the engine start in the first condition; and transitioning from driving vehicle wheels with motor torque to driving vehicle wheels with engine torque after a longer duration since the engine start in the second condition.

11. The method of claim 10, wherein the first condition is an operator wide-open pedal tip-in, and wherein the second condition is an operator tip-in less than wide-open pedal.

12. The method of claim 11, wherein during the engine start in the first condition, a valve coupling the accumulator to the intake manifold is held partially open, and an air intake throttle is throttled less, and wherein during the engine start in the second condition, the valve coupling the accumulator to the intake manifold is held closed, and the air intake throttle is throttled more.

13. The method of 12, wherein during the engine start in the first condition, cranking the engine with advanced intake valve timing includes cranking the engine with an intake camshaft timing fully advanced; and wherein during the engine start in the second condition, cranking the engine with retarded intake valve timing includes cranking the engine with the intake camshaft timing retarded by an amount based on one or more of vehicle speed and driver torque demand.

14. The method of claim 13, further comprising, after the engine start in each of the first and second conditions, operating the engine on a Miller cycle, and while operating the engine in the Miller cycle, at least partially opening the valve coupled to the accumulator to charge the accumulator with intake manifold compressed air received from a turbocharger compressor until a threshold accumulator pressure is reached, and then closing the valve.

15. A method for a hybrid vehicle, comprising:
during vehicle operation with an engine disabled,
responsive to an operator torque request, restarting the engine, and
during the engine restarting, discharging compressed air from an accumulator to the engine, a timing of the discharge being based on determined engine coolant temperature and in-cylinder temperature.

16. The method of claim 15, further comprising, during engine operation after the engine starting, opening an accumulator valve to charge the accumulator with compressed air received in an engine intake manifold from a turbocharger compressor.

17. The method of claim 16, wherein opening the accumulator valve includes partially opening the accumulator valve, a degree of opening the valve to charge the accumulator based on the ability of an intake air charging system to fully supply a pressure required by the engine to meet a torque demand without disturbance.

18. The method of claim 15, further comprising, during the engine restarting, operating with advanced intake timing relative to a base timing, and
after the engine restarting, operating with retarded intake timing relative to the base timing.

19. The method of claim 18, wherein the operator torque request is a wide-open pedal tip-in, and
further comprising, in response to a tip-in less than wide-open pedal, restarting the engine without discharging compressed air from the accumulator and while operating with retarded intake valve timing relative to the base timing.

* * * * *